Figure 1:
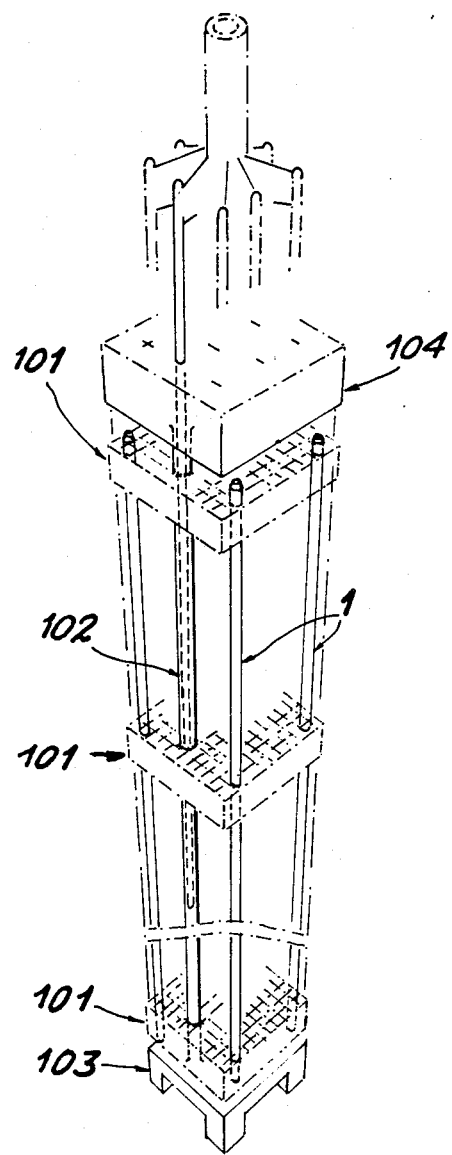

United States Patent [19]

Razafindrazaka

[11] Patent Number: 4,888,152
[45] Date of Patent: Dec. 19, 1989

[54] FUEL ASSEMBLY GRID FOR LIGHT WATER REACTOR

[75] Inventor: Lioka Razafindrazaka, Montigny le Bretonneux, France

[73] Assignee: Commissariat A L'Energie Atomique, Paris, France

[21] Appl. No.: 146,215

[22] Filed: Jan. 20, 1988

[30] Foreign Application Priority Data

Jan. 21, 1987 [FR] France .................. 87 00660

[51] Int. Cl.⁴ .............................. G21C 3/34
[52] U.S. Cl. ...................... 376/462; 376/442
[58] Field of Search ............ 376/441, 442, 462

[56] References Cited

U.S. PATENT DOCUMENTS

| | | | |
|---|---|---|---|
| 3,298,922 | 1/1967 | Prince et al. ............. | 376/441 |
| 3,301,764 | 1/1967 | Timbs et al. ............. | 376/441 |
| 4,056,441 | 11/1977 | Marmonier et al. ........ | 376/442 |
| 4,312,705 | 1/1982 | Steinke .................. | 376/441 |
| 4,567,015 | 1/1986 | Bosshard ................. | 376/462 |
| 4,594,216 | 6/1986 | Feutrel .................. | 376/442 |
| 4,758,403 | 7/1988 | Noailly .................. | 376/439 |

FOREIGN PATENT DOCUMENTS

| | | | |
|---|---|---|---|
| 657221 | 6/1965 | Belgium . | |
| 0065613 | 12/1982 | European Pat. Off. ....... | 376/462 |
| 0192534 | 8/1986 | European Pat. Off. . | |
| 1093500 | 11/1960 | Fed. Rep. of Germany .... | 376/442 |
| 1514559 | 6/1969 | Fed. Rep. of Germany .... | 376/441 |
| 1366575 | 6/1964 | France . | |
| 1570013 | 6/1969 | France . | |
| 2241129 | 3/1975 | France . | |
| 0228990 | 11/1985 | Japan .................... | 376/442 |
| 483695 | 12/1969 | Switzerland . | |
| 1193817 | 6/1970 | United Kingdom .......... | 376/441 |

Primary Examiner—Harvey E. Behrend
Assistant Examiner—Daniel Wasil
Attorney, Agent, or Firm—Michael N. Meller

[57] ABSTRACT

A grid for the fuel rods of a light water reactor.

It is formed by cylinder portions (11, 13) of polygonal section having cut-out parts (12) in which the projecting portions (15) of those adjacent cylinder portions are overlapped against which the rods (1) bear. The portions are then assembled.

8 Claims, 5 Drawing Sheets

FUEL ASSEMBLY GRID FOR LIGHT WATER REACTOR

The invention relates to a fuel assembly grid for retaining in place the fuel rods of light water reactors.

In known examples the grids ensuring the lateral and axial retention of the fuel rods are as a rule formed by small plates assembled in a predefined network. The assembly of small plates, welded at their intersections, bounds cells inside which a fuel rod or a guide tube extends. The small plates have springs and bosses ensuring the lateral and axial retention of the fuel rods. European Patent 0033 263 discloses a grid of this kind.

The invention discloses cells formed by cylinder portions of polygonal section which have previously been provided with cut-out parts or recessed over a part of their height and which are so arranged that their sections partially overlap one another: the retention of the rods in the cells is therefore ensured by the parts of the adjacent cylinder portions entering the cell in question. Assemblies of high rigidity can be obtained by assembling the different portions, more particularly by welding.

Advantageously the parts which enter the cell are projecting and terminate in flat portions against which the rods bear. The general shape of the sections of the cylinder portions, with the exception of the flat portions is square in a square network or triangular in a hexagonal network.

The grid according to the invention has many advantages over that disclosed in the European Patent. It is preferably made from materials such as zircaloy, which is advantageous for its low neutron capture properties, even though its mechanical characteristics are mediocre. Its rigidity, more particularly against buckling, is mainly ensured by the small free lengths of the sides of the geometrical figures resulting from the overlapping of the cells; the cells can therefore be made from a thin metal, something which contributes towards reducing the hydraulic resistance of the grid. Another advantage of the invention is to provide an assembly of simple elementary cells not having many variants, unlike the European Patent, in which the small plates have numerous variants. The manufacture of the grid according to the invention is simplified as a result and its cost reduced.

A method is also known in which the rods are retained between the outer surface or overlapping circular rings, some of the rods being also enclosed by another ring. This method was provided for a gas-cooled reactor in which the rods are short, their end plugs being borne by the rings.

However, the invention has certain other advantages over this Patent. For example, the width of the flat portions can be selected in relation to the spacing pitch of the rods, to prevent the cylinder portions from being too near to the rods, something which would reduce cooling efficiency and at the same time create hot spots, or to prevent the cylinder portions from being too far away from the rods which they enclose, something which would result in poor guiding of the cooling fluid along the rods.

The presence of flat portions enables the rods to be conveniently borne since, even if the cylinder portions are eccentric, the rods still bear against a line on the surface of the flat portions and thus remain correctly retained in place.

Figure 7:
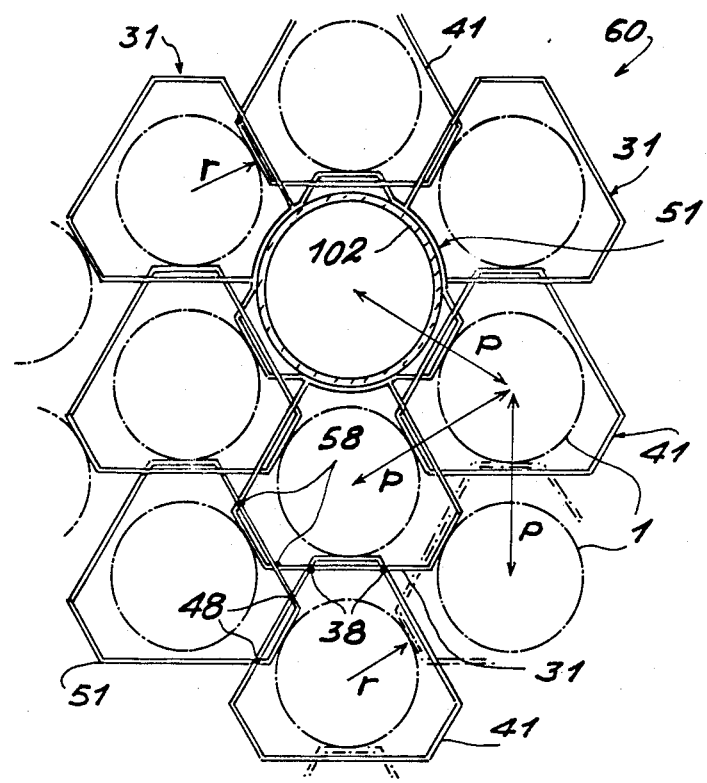

Lastly, the selection of simple polygons enables the number of bearings to be limited, three bearings being provided for each rod in the construction illustrated in FIG. 7. This reduces total hyperstaticity, something which is very advantageous in the case of rods several meters in length.

Figure 3:
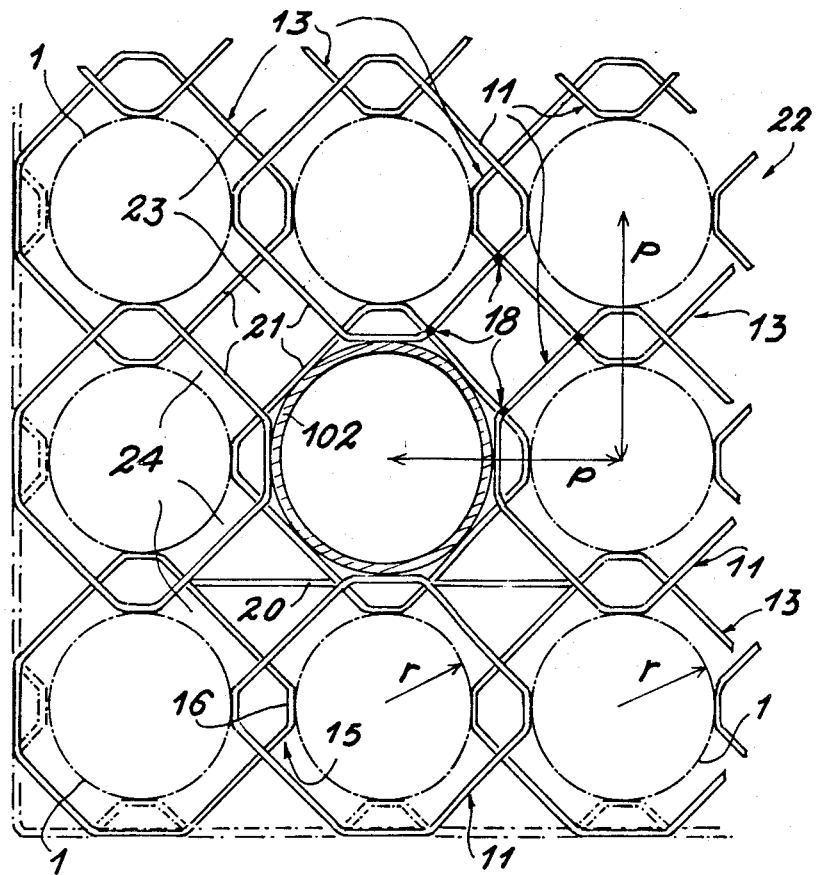
Figure 2:
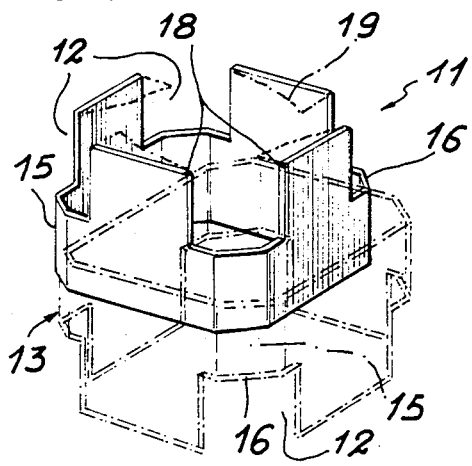
Figure 9:
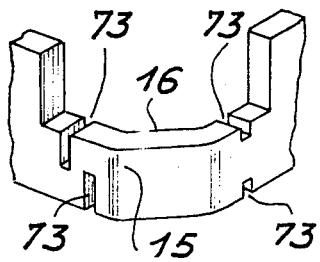
Figure 10:
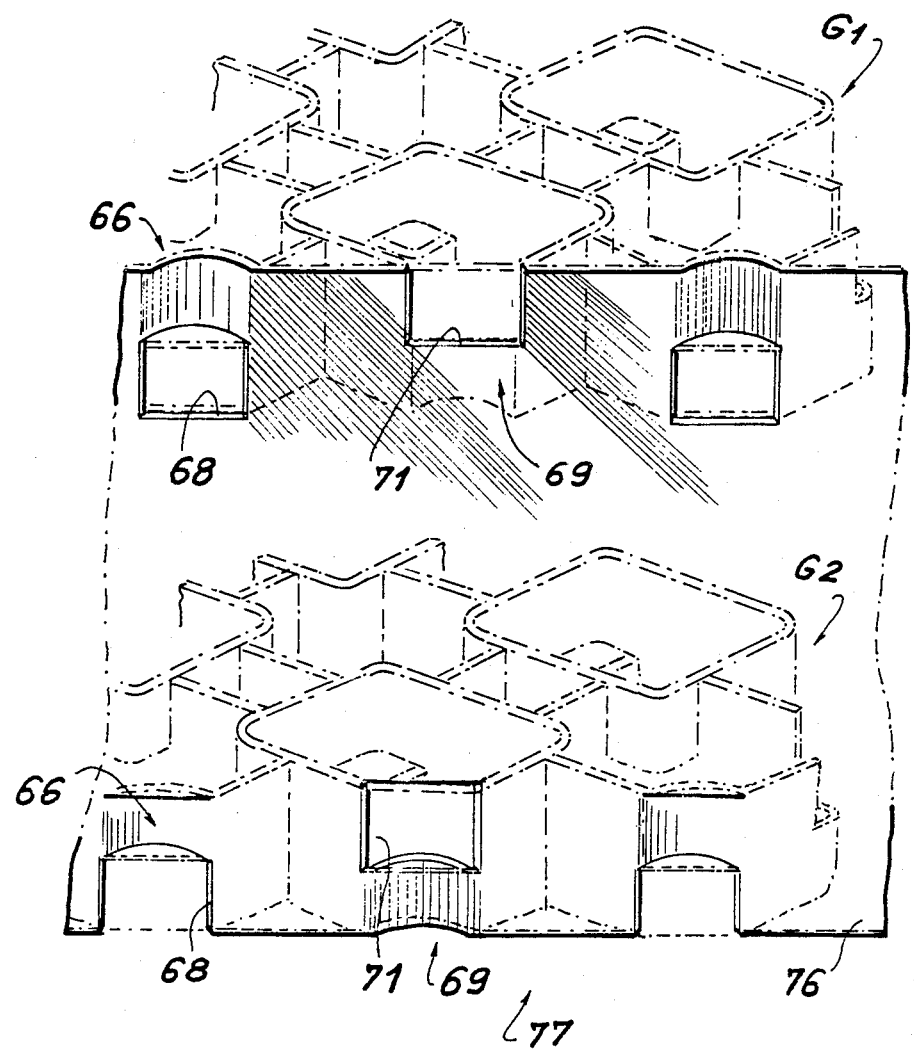

The invention will now be disclosed more concretely with reference to the following illustrative and non-limiting drawings, wherein:

FIG. 1 is a perspective view of a possible arrangement of nuclear fuel rods by means of grids, FIG. 2 shows a cylinder portion which can be used for making a grid according to the invention, FIG. 3 is a front view of a grid produced from the cylinder portions shown in FIG. 2, FIGS. 4, 5 and 6 show three cylinder portions which can be used in combination for a variant embodiment of the grid according to the invention, FIG. 7 is a front view of a grid constructed from the elements illustrated in FIGS. 4 to 6, FIG. 8 is a perspective view of an edging element which can be used for the grids according to the invention, FIG. 9 shows a design detail which can be applied to the cylinder portions according to the invention, and FIG. 10 shows a variant comprising two superimposed grids, spaced out and enclosed by an edging.

FIG. 1 shows diagrammatically how grids 101, three grids in this case, are so arranged as to retain in place a cluster of nuclear fuel rods 1, only some of which are shown. The rods 1, which have a length of the order of four meters, have one of their ends attached to an end member 103 or 104. Guide tubes 102 interconnect the end members 103 and 104.

We are here dealing more particularly with the grids according to the invention. In a first preferred embodiment they can be constructed by assembling cylinder portions of substantially square section 11 and 13 (FIG. 2). Preferably over half their height the cylinder portions 11 and 13 have cut-out parts 12 located at their corners 15.

The cylinder portions are assembled by so overlapping them that their cut-out parts are alternately in the upper part (portions 11) or the lower part (portions 13); then a corner 15 of the cylinder portion 13 is introduced into a cut-out part 12 of the adjacent cylinder portion 11. Final assembly is performed by welding at the intersections 18.

The corners 15 have flat portions 16 acting as bearings for the rods 1, as can be seen from the grid 22 shown in FIG. 3. Each rod 1 is enclosed by the four sides 21 of a cylinder portion 11 or 13 and supported by four other cylinder portions 11 and 13.

As can be seen in FIG. 3, the cylinder portions 11 and 13 are disposed in two superimposed offset quincunxes. The rods 1 bear against the flat portions 16.

To this point the cylinder portions 11 or 13 were considered to be all alike. If the assembly comprises guide tubes 102, the cylinder portions adjacent the guide tubes will have an adapted shape. The rigidity of this grid is enhanced by adding ribs 20 on a diagonal of a square 23 formed by four sides 21 belonging to four adjacent cylinder portions 11 and 13.

By varying the width of the flat portions 16 it is possible to vary the areas of the square 13 and of the curvilinear rectangle 24 mainly bounded by one side 21 and one rod 1—i.e., adapt the characteristics of flow of the cooling fluid for the rods 1 by adjusting the load losses due to passage through the grid and by channelling the fluid along the rods 1. For certain values of the spacing pitch of the rods 1 and their radius r, the flat portions 16 enable the sides 21 of the rod 1 which they enclose to be disengaged. They then enable the rods 1 to be readily assembled in the grid 22, since they ensure stable bearing in one plane, even if the cylinder portion 11 or 13 of which they form part deviates to one side or is mounted twisted after incorrect manufacture.

The cylinder portions 11 and 13 can be produced by any suitable means, more particularly by forming portions of originally cylindrical section, followed by the cutting of the cut-out parts 12, the welding of the elementary panels or else direct extrusion. The cylinder portions 11 and 13 can be identical, the portions 13 being simply turned over. However, the ends of the sides 21 of certain portions 11 can be profiled between the cut-out parts 12 with fins 19 to encourage the mixing of the cooling fluid. The fins 19 are shown curved inwards towards the inside of the cylinder portion 11 and are of variable width.

Figure 6:
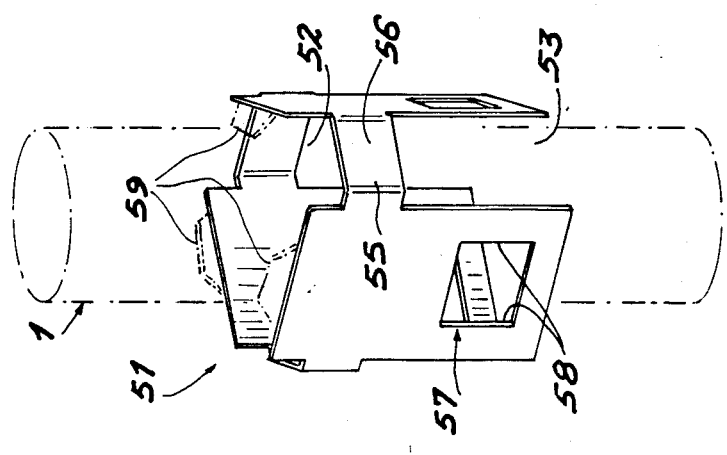
Figure 5:
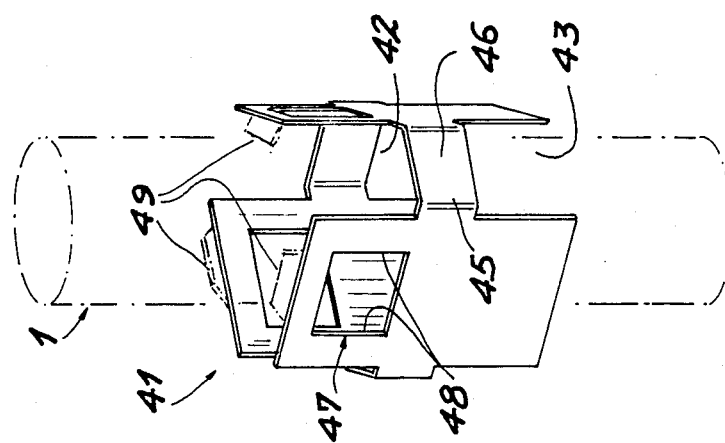
Figure 4:
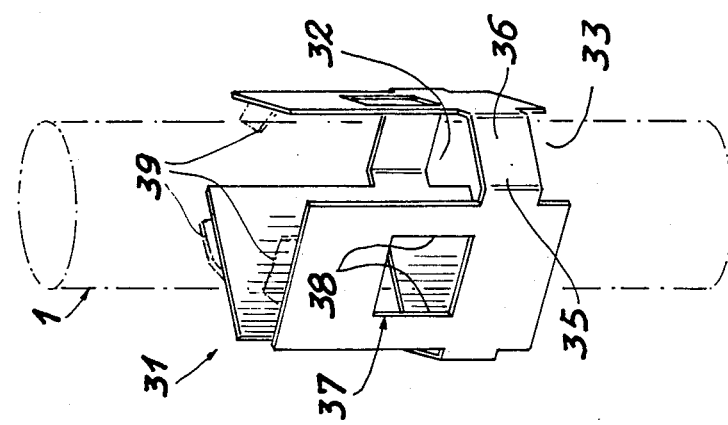

Since the mechanical members shown in FIG. 4, 5 and 6 have to a large extent similar characteristics, they will be described together. In this particular embodiment of the invention the cylinder portions 31, 41 and 51 adapted to form a grid have a substantially triangular shape with corners formed as flat portions, i.e., truncated vertices, 36, 46 and 56 respectively. The height of the corners 35, 45, 55 is reduced by cut-out parts starting from the two ends of the portions 31, 41 and 51: there are upper cut-out parts 32, 42, 52 and lower cut-out parts 33, 43 and 53 which face one another on the portions 31, 41 and 51 respectively. In FIG. 4 the upper cut-out parts 32 are deep and the lower cut-out parts 33 superficial, while the converse situation obtains for the cut-out parts 52 and 53 in FIG. 6, the cut-out parts 42 and 43 in FIG. 5 having a substantially equal depth. Consequently in FIGS. 4 to 6 the corners 35 are at the bottom of the portions 31, the corners 45 are at the centre of the portions 41 and the corners 55 are at the top of the portions 51.

Portions 31, 41 and 51 also have rectangular windows 37, 47 and 57 respectively, also disposed at different heights. The windows 37 in the portions 31 are placed at the same height as the corners 45 of the portions 41; the windows 47 of the portions 41 are placed at the same height as the corners 55 of the portions 51; the windows 57 of the portions 51 are placed at the same height as the corners 35 of the portions 31. The size of the windows is moreover large enough for the corners of the other portions placed at their height to be able to partially enter therein. The grid is produced by welding the intersections 38, 48, 58 of the different cylinder portions.

In this case also the portions 31, 41, 51 can have the end of their sides between the upper cut-out parts 32, 42, 52 profiled in fins 39, 39, 59 for mixing the fluid.

Such a grid 60 is shown in FIG. 7. Similarly to grid 21 in FIG. 3, the different portions 31, 41 and 51 form regular overlapping networks. Each portion of one kind, on condition that it is not placed at the edge of the grid 60, is enclosed by three portions of each of the two other kinds placed alternatively with an angular offsetting of 60°. As in FIG. 3, the flat portions 36, 46 and 56 act as bearings for the rods 1; similarly, portions can be provided comprising slightly different shapes to be able to adapt themselves to guide tubes 102 having a diameter different from that of the rods 1.

The main difference from FIG. 3 is that the rods 1 are disposed in a hexagonal, not a square network and that if each rod 1 remains enclosed by a single portion 31, 41 or 51, it is now supported only by three other portions, something which reduces the hyperstaticity of their assembly.

The advantages of this method in comparison with the prior art designs, more particularly as regards the strength of the assembly, the ability to control the flow of the cooling fluid and the advantage of the flat portions 36, 46 and 56 are similar to those listed in the comments on FIG. 3.

At their periphery the grids 22 and 60 have an edging 65 (FIG. 8) which encloses the cells and has lower cut-out parts 68 and upper cut-out parts 71, and also upper bosses 66 having flat portions 67 and lower bosses 69 having flat portions 70 in the case of the portions 11 and 13 of square section. The adjustments to be made for other sections of the cylinder portions can readily be deduced. The lower cut-out parts 68 alternate with the lower bosses 69; similarly, the upper cut-out parts 71 alternate with the upper bosses 66. The upper bosses 66 are disposed above the lower cut-out parts 68, and exclusively at those places. The upper cut-out parts 71 are disposed above the lower bosses 69, and exclusively at those places.

Contact between the edging 65 and the portions 11 is established at the location of the lower cut-out parts 68 and the upper bosses 66; contact between the portions 13 and the edging 65 is established at the location of the upper cut-out parts 71 and the lower bosses 69. The edging 65 and the portions 11 and 13 are so assembled by welding that the bosses 66 and 69 enter the portions 11 and 13 respectively and can thus act as bearings for the rods 1 disposed in the portions 11 and 13 adjacent the edging 65.

Figure 8:
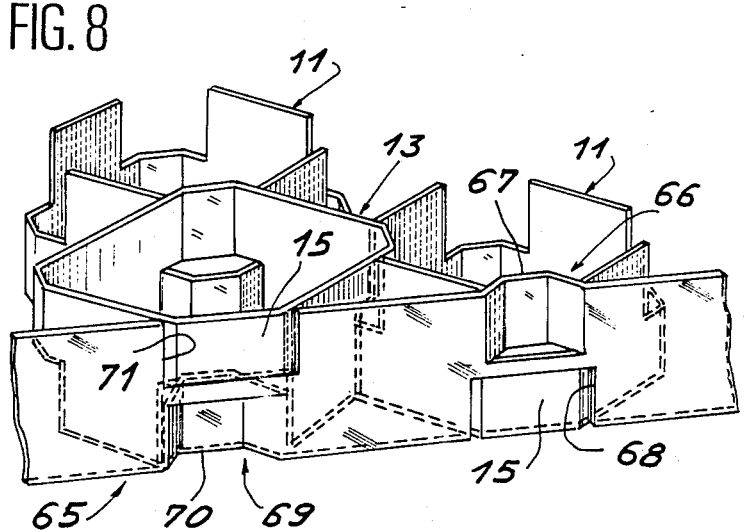

With this design no cylinder portion remains unoccupied. As shown in FIG. 8, it is also possible to deform the corners 15, which so adapt themselves in the cut-out parts 68 and 71 that after assembly they form a continuation of the edging 65.

The grids according to the invention do not ensure the function of axial retention of the fuel rods. Such retention can be assured at the lower or upper end member of the assembly by means of a known attachment system, for example, that disclosed in French Patent 2 577 343.

It is possible to ensure not only that the rods 1 have a bearing but also that they are actually clamped. For this purpose the resilience of the corners 15, 35, 45 or 55 in contact with the rods 1 must be increased, while so dimensioning them that the distance between these corners in the grid 22 or 60 is slightly smaller than the diameter of the rods 1. The result is therefore an assembly with a slightly negative clearance. In that case a satisfacctory means of increasing the flexibility of the corners consists in producing therein longitudinal notches 73 which weaken its strength (FIG. 9).

On the other hand, to reduce hydraulic load losses by friction it is possible to reduce the height of the cells while maintaining an adequate guide length for the fuel elements. To this end, by means of a peripheral edging 77 of adequate width, preferably two low superimposed grids $G_1$ and $G_2$ are assembled, each in conformity with one of the embodiments disclosed hereinbefore (FIG. 10). The assembly, whose height results from the height of the peripheral edging 76, forms a grid 77. The existence of the two spaced-out grids disturbs the regularity of the flow of the coolant as it passes through the grids, thus obtaining the "mixing" function. The cells can be of square or triangular section. As in the case of the preceding edging 65, the edging 76 is formed with cut-out parts and recesses by which the grid $G_1$ and $G_2$ are positioned and which have the same references.

If the mixing is inadequate, it is possible to profile as fins 19, 39, 49, 59 the ends of the cylinder portions outside the cut-out parts so as to further disturb the flow. The number of fins must be optimized in accordance with the characteristics of the network of rods, the power distribution and the surrounding thermohydraulic conditions, so as to prevent the occurrence of vapor film.

What is claimed is:

1. A grid for assembling a plurality of nuclear fuel rods, comprising a plurality of cylinder portions and means for joining said cylinder portions in a parallel array, wherein each of said cylinder portions has a substantially polygonal cross section comprising a plurality of sides connected by a corresponding plurality of flat portions, each one of said fuel rods being encompassed by a corresponding one of said cylinder portions, each cylinder portion having a plurality of cut-outs, each cut-out extending over a corresponding part of the height of said cylinder portion and having a flat portion of a different cylinder portion inserted therein, whereby each of said nuclear fuel rods not arranged on the periphery of said grid bears against a flat portion of each of a predetermined number of said cylinder portions, but does not bear against any portion of the cylinder portion encompassing the respective fuel rod.

2. The grid as defined in claim 1, wherein said predetermined number is four, said substantially polygonal cross section is a square and said flat portions are truncated corners.

3. The grid as defined in claim 1, wherein said predetermined number is three, said substantially polygonal cross section is a triangle and said flat portions are truncated vertices.

4. The grid as defined in claim 2, wherein each of said cut-outs comprises a recess extending from a top edge of said cylinder portion.

5. The grid as defined in claim 3, wherein each of said cut-outs comprises a window formed in said cylinder portion.

6. The grid as defined in claim 1, further comprising an edging arranged to peripherally surround said plurality of cylinder portions, said edging comprising a plurality of projecting portions, each of said projecting portions being inserted in a cut-out of a corresponding one of said cylinder portions, the nuclear fuel rod encompassed by said corresponding one of said cylinder portions bearing on said corresponding projecting portion.

7. The grid as defined in claim 1, further comprising fin means extending from the top edge of at least one of said cylinder portions for disturbing the fluid flowing through said grid.

8. The grid as defined in claim 1, wherein each of said cut-outs is formed in a portion of said cylinder portion comprising one of said flat portions.

* * * * *